US00RE45096E

(19) United States
(12) Reissued Patent
Harrison et al.

(10) Patent Number: US RE45,096 E
(45) Date of Reissued Patent: Aug. 26, 2014

(54) VOICE RESPONSE SYSTEM

(75) Inventors: Michael Andrew Harrison, Little Stonham (GB); Paul Ian Popay, Ipswich (GB); Neil Lewis Watton, Bury St Edmunds (GB)

(73) Assignee: British Telecommunications public limited company, London (GB)

(21) Appl. No.: 12/458,605

(22) Filed: Jul. 16, 2009

Related U.S. Patent Documents

Reissue of:
(64) Patent No.: 7,245,706
Issued: Jul. 17, 2007
Appl. No.: 10/474,904
PCT Filed: Apr. 8, 2002
PCT No.: PCT/GB02/01643
§ 371 (c)(1),
(2), (4) Date: Oct. 16, 2003
PCT Pub. No.: WO02/087202
PCT Pub. Date: Oct. 31, 2002

(30) Foreign Application Priority Data

Apr. 19, 2001 (EP) ..... 01303600

(51) Int. Cl.
*H04M 11/00* (2006.01)
*H04M 1/64* (2006.01)

(52) U.S. Cl.
USPC ..... 379/88.16; 379/88.22

(58) Field of Classification Search
USPC ..... 379/88.23
See application file for complete search history.

(56) References Cited

U.S. PATENT DOCUMENTS 4,932,021 A * 6/1990 Moody ..... 379/88.23
5,694,558 A 12/1997 Sparks et al.
5,787,151 A * 7/1998 Nakatsu et al. ..... 379/88.23
5,818,908 A * 10/1998 Kaplan ..... 379/88.21
6,016,336 A * 1/2000 Hanson ..... 379/88.23
6,061,433 A * 5/2000 Polcyn et al. ..... 379/93.12
6,167,117 A * 12/2000 Will ..... 379/88.03
6,349,134 B1 * 2/2002 Katz ..... 379/92.01
6,370,238 B1 * 4/2002 Sansone et al. ..... 379/88.23
6,404,874 B1 * 6/2002 Chestnut ..... 379/211.02
6,434,223 B2 * 8/2002 Katz ..... 379/93.13
6,449,496 B1 * 9/2002 Beith et al. ..... 455/563
6,456,619 B1 * 9/2002 Sassin et al. ..... 370/356
6,487,277 B2 * 11/2002 Beyda et al. ..... 379/88.01
6,501,832 B1 * 12/2002 Saylor et al. ..... 379/88.04
6,512,415 B1 * 1/2003 Katz ..... 379/88.22
6,570,967 B2 * 5/2003 Katz ..... 379/93.12

(Continued)

FOREIGN PATENT DOCUMENTS

EP 0697780 A2 2/1996
EP 0973314 A2 1/2000

(Continued)

OTHER PUBLICATIONS

Office Action issued in EP Application No. 02720194.6, dated Jun. 21, 2007.

(Continued)

*Primary Examiner* — Joseph T Phan
(74) *Attorney, Agent, or Firm* — Nixon & Vanderhye P.C.

(57) ABSTRACT

With interactive voice response services, it can be frustrating for a user to become stuck in a dialogue where the same question is asked repetitively. Here the wording of questions used by the system are varied throughout the dialogue depending upon how many times a user has visited a particular dialogue state during the call history. Furthermore the wording of the question is also varied in dependence upon the way in which the question was asked the last time the user was in a particular dialogue state.

17 Claims, 4 Drawing Sheets

(56) References Cited

U.S. PATENT DOCUMENTS

| | | | | |
|---|---|---|---|---|
| 6,584,181 | B1 * | 6/2003 | Aktas et al. | 379/88.23 |
| 6,678,360 | B1 * | 1/2004 | Katz | 379/88.2 |
| 6,707,889 | B1 * | 3/2004 | Saylor et al. | 379/88.04 |
| 6,757,362 | B1 * | 6/2004 | Cooper et al. | 379/88.01 |
| 6,792,086 | B1 * | 9/2004 | Saylor et al. | 379/88.17 |
| 6,850,949 | B2 * | 2/2005 | Warner et al. | 707/101 |
| 6,885,733 | B2 * | 4/2005 | Pearson et al. | 379/76 |
| 6,888,929 | B1 * | 5/2005 | Saylor et al. | 379/88.16 |
| 6,895,084 | B1 * | 5/2005 | Saylor et al. | 379/88.22 |
| 7,003,079 | B1 * | 2/2006 | McCarthy et al. | 379/32.01 |
| 7,245,706 | B2 * | 7/2007 | Harrison et al. | 379/88.16 |
| 7,324,942 | B1 * | 1/2008 | Mahowald et al. | 704/270 |
| 7,415,100 | B2 * | 8/2008 | Cooper et al. | 379/88.01 |
| 7,457,397 | B1 * | 11/2008 | Saylor et al. | 379/88.17 |
| 7,756,258 | B2 * | 7/2010 | Clift et al. | 379/88.25 |
| 7,920,678 | B2 * | 4/2011 | Cooper et al. | 379/8 |
| 8,000,453 | B2 * | 8/2011 | Cooper et al. | 379/88.03 |

FOREIGN PATENT DOCUMENTS

| | | | |
|---|---|---|---|
| EP | 0 992 980 | A2 | 4/2000 |
| GB | 2342530 | | 4/2000 |
| WO | WO 00/65814 | | 11/2000 |
| WO | WO 0078022 | A1 | 12/2000 |

OTHER PUBLICATIONS

Power, "The Listening Telephone—Automating Speech Recognition Over the PSTN", BT Technology Journal, BT Labroatories, GB, vol. 14, No. 1, 1996, pp. 112-126, XP000554564, ISSN: 1358-3948.

Pawlewski et al, "Advances in Telephony-Based Speech Recognition", BT Technology Journal, BT Laboratories, GB, vol. 14, No. 1, 1996, pp. 127-149, XP000554644, ISSN: 1358-3948.

Attwater et al, "Issues in Large-Vocabulary Interactive Speech Systems", BT Technology Journal, BT Laboratories, GB, vol. 14, No. 1, 1996, pp. 177-186, XP000554647.

Attawater et al, "Large-Vocabulary Data-Centric Dialogues", BT Technology Journal, BT Laboratories, GB, vol. 17, No. 1, Jan. 1999, pp. 149-159, XP000824588, ISSN: 1358-3948.

Whittaker et al, "Interactive Speech Systems for Telecommunications Applications", BT Technology Journal, BT Laboratories, GB, vol. 14, No. 2, Apr. 1, 1996, pp. 11-23, XP000584907, ISSN: 1358-3948.

* cited by examiner

User Dialogue data

User id

Node: Total number of visits: Visited during this call: Last message played during this call
Node: Total number of visits: Visited during this call: Last message played during this call
.....

Figure 4

VOICE RESPONSE SYSTEM

Matter enclosed in heavy brackets [ ] appears in the original patent but forms no part of this reissue specification; matter printed in italics indicates the additions made by reissue.

This application is the US national phase of international application PCT/GB02/01643 filed 8 April 2002 which designated the U.S.

TECHNICAL FIELD

This invention relates to a voice response apparatus and method, particularly although not exclusively for accessing and updating remotely held data using a telephone.

BACKGROUND TO THE INVENTION AND PRIOR ART

In known voice response systems a dialogue model is used to model a dialogue between a user and the system. Often such a dialogue model comprises states (or nodes) which are notionally connected by edges. Conceptually a user making a call to the visits a state and the system asks the user a question in dependence up on the current state the user is visiting. The user's answer is analysed by the system in order to decide which state the user should visit next, and hence what the next question should be.

However, a problem with such a system is that it is possible for the user to get 'stuck' in a particular state, and hence the dialogue becomes repetitive. In the worst case the user terminates the call, at the very least the user is discouraged from using the system again even if they do eventually achieve the task they set out to do.

SUMMARY OF THE INVENTION

According to a first aspect of the present invention there is provided a method of operating a current dialogue with a user of an interactive voice response system having a dialogue model comprising a plurality of states and a plurality of interconnecting edges;

a current state; and user dialogue data indicating for a user a total number of visits to a state;

in which a prompt definition, for use by a message generator to generate a message for sending to the user, is selected dependence upon the current state, upon the number of visits made to the current state during the current dialogue and upon the total number of visits said user has made to the current state during one or more previous dialogues.

Preferably the prompt definition is selected in dependence on further data indicating whether the user has visited the current state during the current dialogue and upon data indicating the prompt which was selected for the most recent visit to the current state.

Moreover, from a second aspect the present invention further provides an interactive voice response system having a dialogue model comprising:

a plurality of states and a plurality of interconnecting edges;

a current state; and user dialogue data indicating for a user a total number of visits to a state;

the system further comprising prompt definition selection means for selecting a prompt definition, for use by a message generator to generate a message for sending to the user, in dependence upon the current state, upon the number of visits made to the current state during the current dialogue and upon the total number of visits said user has made to the current state during one or more previous dialogues.

BRIEF DESCRIPTION OF THE DRAWINGS

An embodiment of the present invention will now be described, presented by way of example only, with reference to the accompanying drawings in which:

FIG. 4 illustrates part of the user dialogue data store of FIG. 1.

DESCRIPTION OF THE PREFERRED EMBODIMENT

Figure 1:
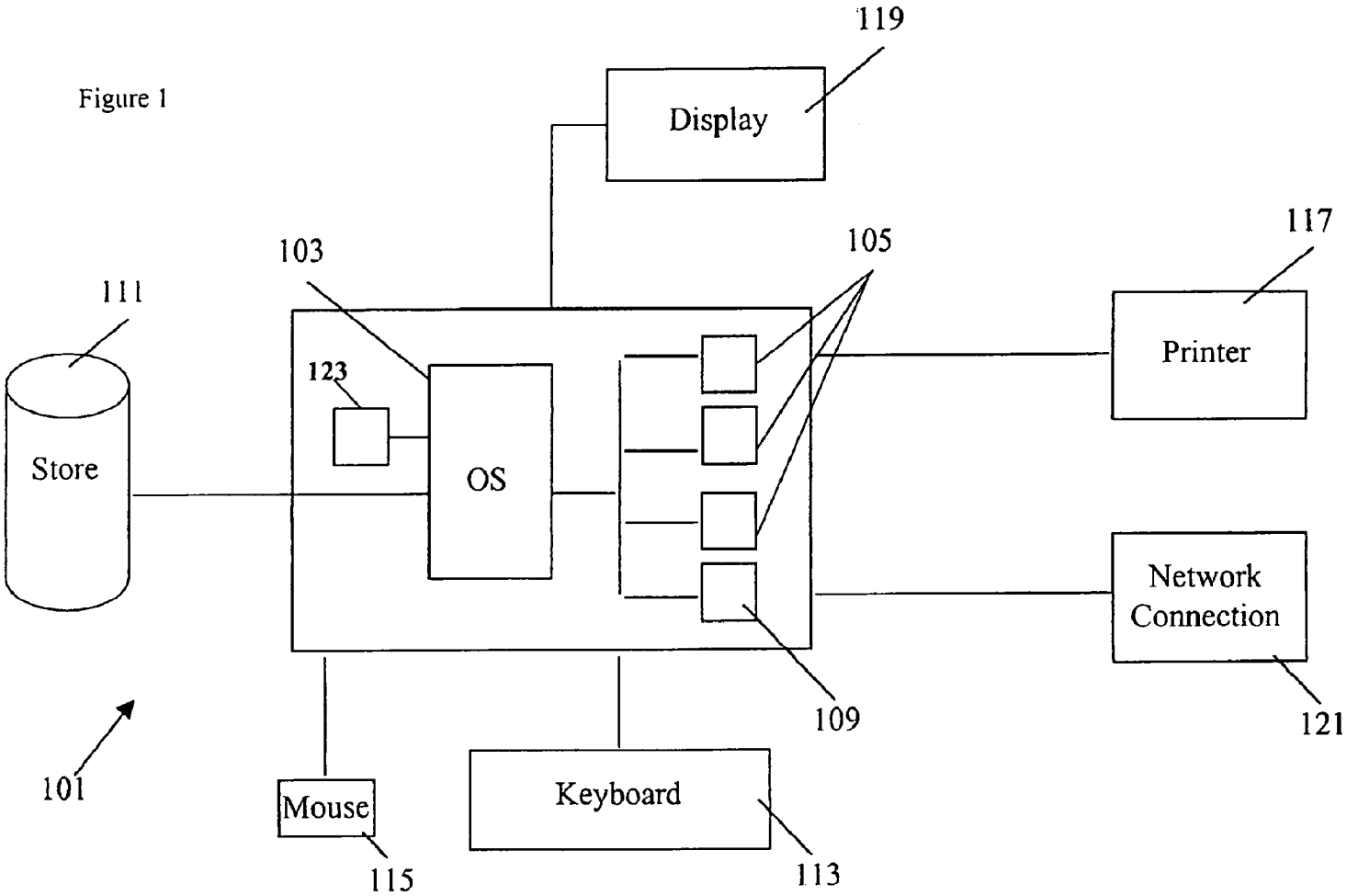
FIG. 1 is a schematic representation of a computer loaded with software embodying the present invention.

FIG. 1 illustrates a conventional computer 101, such as a Personal Computer, generally referred to as a PC, running a conventional operating system 103, such as Windows (a Registered Trade Mark of Microsoft Corporation), having a store 123 and having a number of resident application programs 105 such as an e-mail program, a text to speech synthesiser, a speech recogniser, a telephone interface program or a database management program. The computer 101 also has a program 109 which together with data stored in the store 123, and resident application programs provides an interactive voice response system as described below with reference to FIG. 2.

The computer 101 is connected to a conventional disc storage unit 111 for storing data and programs, a keyboard 113 and mouse 115 for allowing user input and a printer 117 and display unit 119 for providing output from the computer 101. The computer 101 also has access to external networks (not shown) via a network connection card 121.

Figure 2:
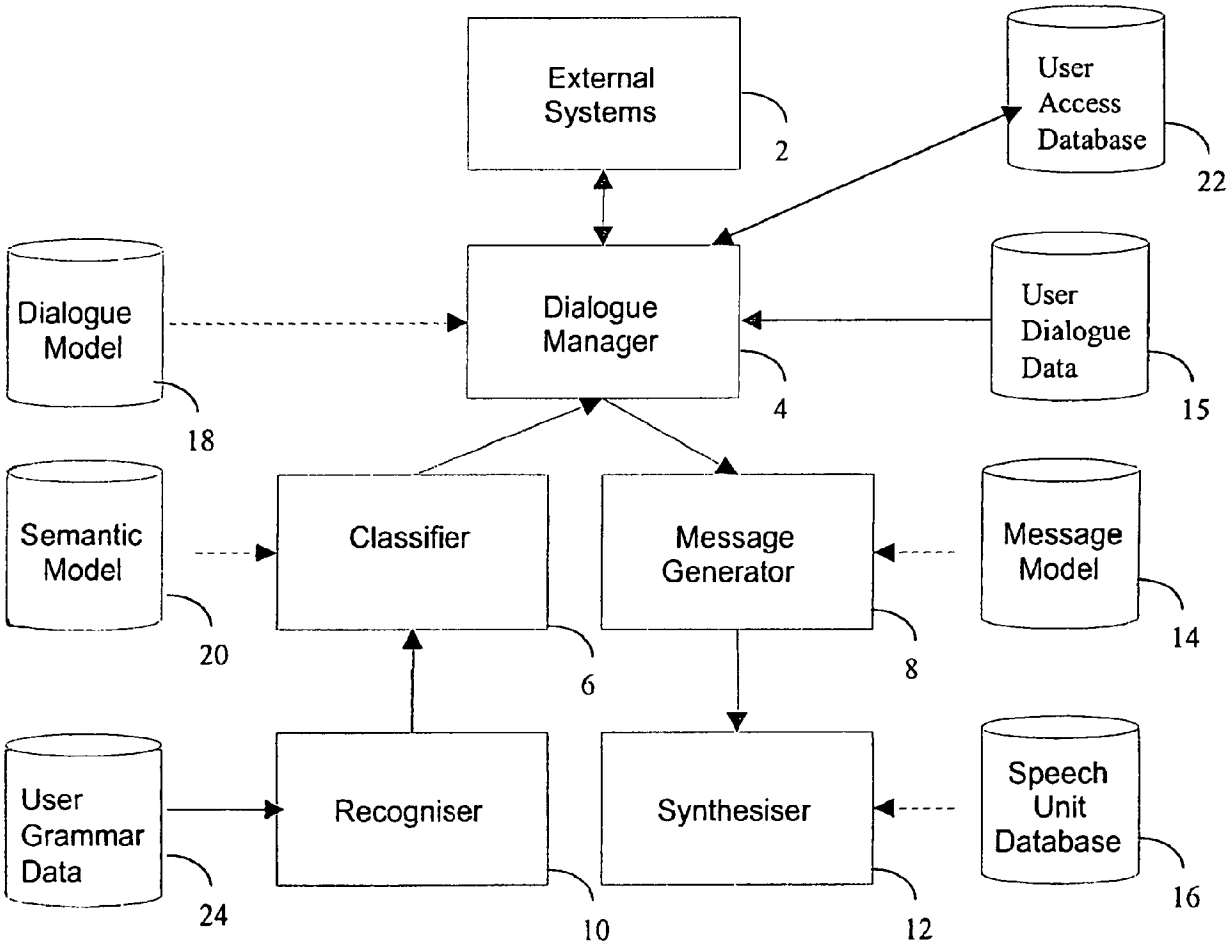
FIG. 2 shows an architecture of a natural language system embodying the present invention.
Figure 3:
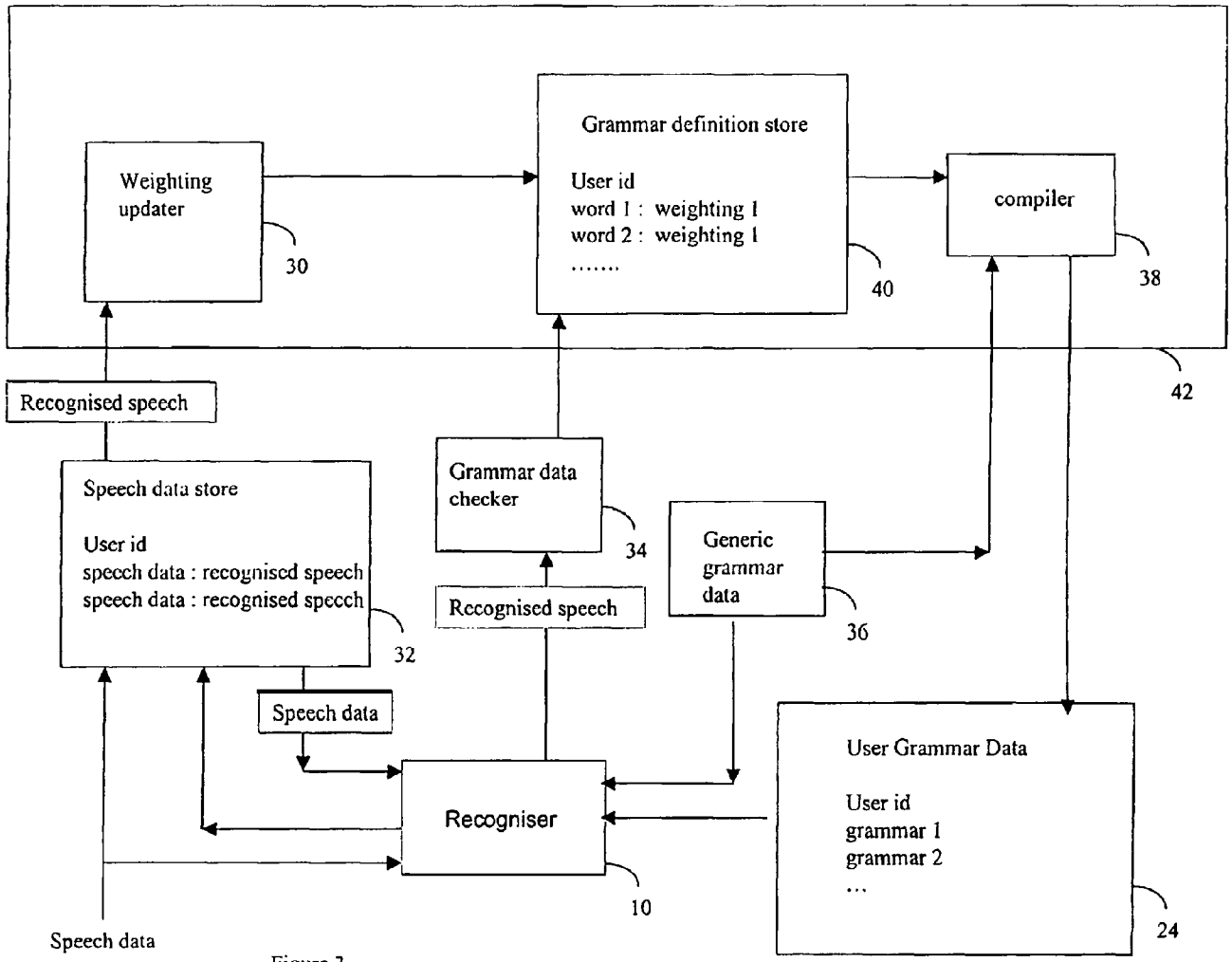
FIG. 3 illustrates a grammar data updater according to the present invention.

FIG. 2 shows an architecture of an embodiment of the interactive voice response system according to this invention. A user's speech utterance is received by a speech recogniser 10. The received speech utterance is analysed by the recogniser 10 with reference to a user grammar data store 24. The user grammar data store 24 represents sequences of words or sub-words which can be recognised by the recogniser 10 and the probability of these sequences occurring. The recogniser 10 analyses the received speech utterance, with reference to speech units which are held in a speech unit database 16, and provides as an output a representation of sequences of words or sub-words which most closely resemble the received speech utterance. In this embodiment of the invention the representation comprises the most likely sequence of words or sub-words, in other embodiments the representation could be a graph of the mostly likely sequences.

Recognition results are expected to be error prone, and certain words or phrases will be much more important to the meaning of the input utterance that others. Thus, confidence values associated with each word in the output representation are also provided. The confidence values give a measure related to the likelihood that the associated word has been correctly recognised by the recogniser 10. The output graph including the confidence measures are received by a classifier 6, which classifies the received graph according to a predefined set of meanings, with reference to a semantic model 20 (which is one of a plurality (not shown) of possible semantic models) to form a semantic classification. The semantic classification comprises a vector of likelihoods, each likelihood relating to a particular one of the predefined set of meanings. A dialogue manager 4 operates using a state based dialogue model 18 as will be described more fully later. The dialogue manager 4 uses the semantic classification vector and information about the current dialogue state together with information from the dialogue model 18 and user dialogue data 15 to instruct a message generator 8 to generate a message, which is spoken to the user via a speech synthesiser 12. The message generator 8 uses information from a message model 14 to construct appropriate messages. The speech synthesiser uses a speech unit database 16 which contains speech units representing a particular voice. The dialogue manager 4 also instructs the recogniser 10 which user grammar to use from the user grammar data store 24 for recognising a received response to the generated message, and also instructs the classifier 6 as to the semantic model to use for classification of the received response. The dialogue manager 4 interfaces to other systems 2 (for example, a customer records database).

When a user calls the system the user is asked for a unique user identifier and a personal identification number. If the data entered by the user (which may be spoken or entered using a telephone keypad) matches an entry in a user access database 22 then they are allowed access to the service.

The dialogue model 18 comprises a plurality of states connected together by interconnecting edges. A caller moves to a particular state by speaking a one of several words or phases which are classified by the classifier 6 as having a particular meaning. To use the example above, 'view my calendar' and 'go to my appointments' may be classified as meaning the same thing as far as the dialogue is concerned, and may take the user to a particular dairy access state.

The user dialogue data store 15 stores a count of the number of times a user has visited a particular state in the dialogue model. FIG. 4 shows schematically the contents of the user dialogue data store 15.

Once a user is in a particular state the dialogue manager instructs the message generator to play a message to the caller to guide them as to the actions they may perform. The verbosity of the message depends upon the count of the number of times the user had previously visited that state, which is stored in the user dialogue data store 15. When a new user calls the system, the message used will be verbose as the count will be equal to 0. The messages become more concise as the stored count for that state increases i.e. each time an individual user uses the state, whether or not the use of the state is during a single call or whether the use is during a later call to the system. The count values stored in the store 15 may be updated periodically to reduce the value if a particular user has not used a particular state recently, therefore the messages will become more verbose over time should a user not enter that state in subsequent calls, or if a user has not used the system for some time.

The user dialogue data store 15 also stores a Boolean flag indicating whether or not a user has visited a particular state in the dialogue model within a particular call, together with a record of the message which was played to the user the last time that state was visited. When the user visits the same state on more than one occasion during a particular call, messages will be selected by the dialogue manager 4 to ensure a different message is played to that played last time the state was visited during the call. This avoids the repetition that human factors analysis shows detrimentally affects the likelihood of a user reusing the system. For any sate with potential repetition, there are a plurality of messages stored in the message model store 14, with the next message to be used randomly selected from the set not including the message used previously (which is stored in the user dialogue data store 15).

In order to tailor the system to a particular user so that the system becomes easier to use as the system is used more, each time a user calls the system data is stored in a speech data store 32. Speech data received from the user is recognised by the recogniser 10 with reference to the user grammar data store 24. Initially before any calls have been made by a user the user grammar data is identical to generic grammar data stored in a generic grammar data store 36.

The speech data store 32 stores for each user speech data along with the sequences of words or sub-words which were recognised by the recogniser 10. After each call the recognised speech is used by a weighting updater 30 to update weighting values for words which have been recognised in a grammar definition store 40. For the particular user who made the call the words which have been recognised have a weighting value increased. In other embodiments of the invention words which have not been used also have their weighting value decreased. Once a day a compiler 38 is used to update the user grammar data store 42 according to the weighting values stored in the grammar definition store 40. A method of updating a grammar for a speech recogniser according to provided weighting values is described in our co-pending patent application no EP96904973.3. Together the weighting updater 30, the grammar definition store 40 and the compiler 38 provide the grammar updater 42 of the present invention.

Recognised speech does not need to be stored in a speech data store, in other embodiments of the invention recognised speech may be used to update user grammar data in a single process which may be carried out immediately. Furthermore it will be understood that the updating process could take at predetermined time intervals as described above, or could conveniently be done whenever there is spare processing power available, for example when there are no calls in progress.

The result of the use of the compiler 38 is that words or phrases which a particular user uses more frequently are given a higher weighting in the user grammar data store 24 than those which are hardly ever used. It is possible in fact to effectively delete words from a particular user grammar by providing a weighting value of 0. Of course, it may happen that a user starts to use words which have not been used previously. The recogniser 10 may not recognise these words due to the fact that these words have a very low weighting value associated with them for that user in the user grammar data store 42. In order to prevent this problem the users speech which has been stored in the speech data store 32 is periodically recognised by the speech recogniser 10 using generic grammar data 36, and the recognised speech is sent to a grammar data checker 34 which checks that no words have been recognised which have been previously been given a very low weighting. If this is the case then the weighting value for that word will be updated accordingly, and the compiler 38 is used to update the user grammar data store 42 according to the updated weighting values stored in the grammar definition store 40.

Whilst this invention has been described with reference to stores 32, 40, 42 which store data for each user it will be understood that this data could be organised in any number of ways, for example there could be a separate store for each user, or store 42 could be organised as a separate store for each grammar for each user.

As will be understood by those skilled in the art, the interactive voice response program 109 can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method of operating an interactive voice response system to engage in a current dialogue with a user, said system having a dialogue model comprising a plurality of states and a plurality of interconnecting edges;

a current state;

user dialogue data indicating for a user a total number of visits to a state;

in which the wording of a message for sending to the user at a state repeated in said current dialogue, is selected in dependence upon a) the current state; and b) the number of times the current state has been repeated during the current dialogue; and c) the total number of times the current state has been repeated during one or more previous dialogues with said user; and repeating a) through c) for multiple *ones of* said *plurality of* states.

2. A method according to claim 1 in which the wording of said message is selected in dependence on further data indicating whether the user has previously been at the current stage during the current dialogue and upon data indicating the wording of the message which was selected for the most recent visit to the current state.

3. An interactive voice response system having a dialogue model comprising:

a plurality of states and a plurality of interconnecting edges;

a current state;

user dialogue data indicating for a user a total number of visits to a state;

the system further comprising message wording selection means, for selecting the wording of a message for sending to the user at a state repeated in said current dialogue, in dependence upon a) the current state; and b) the number of times the current state has been repeated during the current dialogue; and c) the total number of times the current state has been repeated during one or more previous dialogues; and repeating a) through c) for multiple *ones of* said *plurality of* states.

4. A system according to claim 3, wherein the message wording selection means is further operable to select the message wording in dependence on further data indicating whether the user has visited the current state during the current dialogue and upon data indicating the message wording which was selected for the most recent visit to the current state.

5. A method of operating an interactive voice response system to engage in a current dialogue with a user, said interactive voice response system storing a dialogue model comprising a plurality of states and a plurality of interconnecting edges, a current state, user dialogue data indicating for a user a total number of visits to a state in the current dialogue and a total number of visits in one or more previous dialogues;

wherein each state represents a stage of the dialogue and each interconnecting edge represents a transition between one stage of the dialogue and a subsequent stage, said method comprising the steps of finding the number of times the current stage has been repeated in the current and previous dialogues from said user dialogue data; and selecting the wording to be output by said interactive voice response system at a repeated stage of the current dialogue in dependence upon a) the current stage in the dialogue; and b) the number of times the current stage has been repeated, and c) the total number of times the user has been at this stage during one or more previous and repeating a) through c) for multiple *ones of* said *plurality of* states.

6. A method according to claim 1 in which the message wording is selected in dependent on further data indicating whether the user has been at the current stage during the current dialogue and upon data indicating the message wording which was selected the previous time the user was at the current stage.

7. An interactive voice response system having a dialogue model comprising:

a plurality of states and a plurality of interconnecting edges;

a current state;

user dialogue data indicating for a user a total number of visits to a state, wherein each state represents a stage of the dialogue and each interconnecting edge represents a transition between one stage of the dialogue and a subsequent stage, the system further comprising:

stage repetition monitoring means arranged in operation to find the number of times the current stage has been repeated in the current and previous dialogues from said user dialogue data, message wording selection means arranged in operation to select the wording of a message for sending to the user at said current repeated stage, said message wording being selected in dependence upon a) the current stage in the dialogue; and b) the number of times the current stage has been repeated; and c) the total number of times the user has been at his stage during one or more previously dialogues; and repeating a) through c) for multiple *ones of* said *plurality of* states.

8. A system according to claim 3, wherein the message wording selection means is further operable to select the message wording in dependence on further data indicating whether the user has earlier visited the current stage during the current dialogue and upon data indicating the message wording which was selected on the most recent occasion on which the user was at the current stage.

*9. A system according to claim 7, wherein the message wording selection means is further operable to select the message wording in dependence on further data indicating whether the user has earlier visited the current stage during the current dialogue and upon data indicating the message wording which was selected on the most recent occasion on which the user was at the current stage.*

*10. A system as in claim 3, wherein the user enters a unique identifier and a personal identification number which must match an entry in a user access database before the user can access the system.*

*11. A system as in claim 10, wherein the user enters the unique identifier and personal identification number using a telephone keypad.*

*12. A system as in claim 10, wherein the user enters the unique identifier and personal identification number by speaking into a telephone.*

*13. A system as in claim 7, wherein the user enters a unique identifier and a personal identification number which must match an entry in a user access database before the user can access the system.*

*14. A system as in claim 13, wherein the user enters the unique identifier and personal identification number using a telephone keypad.*

*15. A system as in claim 13, wherein the user enters the unique identifier and personal identification number by speaking into a telephone.*

*16. A method as in claim 1, wherein the user enters a unique identifier and a personal identification number which must match an entry in a user access database before the user can access the system.*

*17. A method as in claim 2, wherein the user enters a unique identifier and a personal identification number which must match an entry in a user access database before the user can access the system.*

* * * * *